United States Patent
Feldman et al.

(10) Patent No.: US 8,438,936 B2
(45) Date of Patent: May 14, 2013

(54) SENSOR ASSEMBLY INCLUDING A COLLAR FOR MOUNTING SENSORS TO A PIPELINE

(75) Inventors: Solomon Feldman, Brookline, MA (US); Toan Huu Nguyen, Needham, MA (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 13/152,504

(22) Filed: Jun. 3, 2011

(65) Prior Publication Data
US 2012/0304759 A1    Dec. 6, 2012

(51) Int. Cl.
*G01F 1/66* (2006.01)

(52) U.S. Cl.
USPC ........................................................ 73/861.27

(58) Field of Classification Search .................. None
See application file for complete search history.

(56) References Cited

U.S. PATENT DOCUMENTS

| | | | | |
|---|---|---|---|---|
| 3,906,791 | A | * | 9/1975 | Lynnworth ................ 73/861.29 |
| 3,964,308 | A | | 6/1976 | Scarpa |
| 4,004,461 | A | * | 1/1977 | Lynnworth ................ 73/861.27 |
| 4,098,117 | A | * | 7/1978 | Baumoel .................... 73/861.18 |
| 4,286,470 | A | * | 9/1981 | Lynnworth ................ 73/861.18 |
| 4,374,477 | A | * | 2/1983 | Kikuchi et al. ............ 73/861.18 |
| 4,454,767 | A | | 6/1984 | Shinkai et al. |
| 5,052,230 | A | * | 10/1991 | Lang et al. ................ 73/861.28 |
| 5,437,194 | A | * | 8/1995 | Lynnworth ................ 73/861.27 |
| 5,717,145 | A | | 2/1998 | Yasuhara et al. |
| 6,128,072 | A | | 10/2000 | Kiel et al. |
| 6,748,811 | B1 | | 6/2004 | Iwanga et al. |
| 7,252,015 | B2 | | 8/2007 | Konzelmann et al. |
| 7,607,359 | B2 | | 10/2009 | Hecht |
| 2004/0011141 | A1 | * | 1/2004 | Lynnworth ................ 73/861.27 |
| 2007/0151363 | A1 | * | 7/2007 | Ramsesh .................. 73/861.27 |
| 2009/0151472 | A1 | | 6/2009 | Brown et al. |

FOREIGN PATENT DOCUMENTS

| | | |
|---|---|---|
| EP | 0036658 A1 | 9/1981 |
| JP | 1148912 A | 6/1989 |
| WO | 2011020143 A1 | 2/2011 |

OTHER PUBLICATIONS

Search Report and Written Opinion from EP Application No. 12170445.6 dated Oct. 5, 2012.

\* cited by examiner

*Primary Examiner* — Harshad R Patel
(74) *Attorney, Agent, or Firm* — Fletcher Yoder, P.C.

(57) ABSTRACT

A sensor assembly for use with a fluid transport system is provided. The sensor assembly includes at least two sensors that are configured to measure a rate of flow of a fluid channeled through a pipeline of the fluid transport system. Moreover, the sensor assembly includes an annular collar that is coupled to the two sensors. The collar includes at least a first opening and at least a second opening defined therein. The first opening and the second opening are each sized to receive the two sensors therein such that the two sensors are substantially coaxially aligned with each other. A first sensor of the two sensors is positioned downstream from a second sensor of the two sensors.

17 Claims, 4 Drawing Sheets

SENSOR ASSEMBLY INCLUDING A COLLAR FOR MOUNTING SENSORS TO A PIPELINE

BACKGROUND OF THE INVENTION

The field of the invention relates generally to fluid transport systems and, more particularly, sensor assemblies that can be used with a pipeline in a fluid transport system.

Fluid transport is used in a variety of different industries including, but not limited to, the chemical, oil, and gas industries. In at least some known fluid transport applications, fluids are transported from on-shore or off-shore locations to processing plants for subsequent use. Moreover, fluid transport is used in hydrocarbon processing industries and chemical industries, and to facilitate distribution to end-users. Mechanical drives (i.e., gas turbines) and/or electrical machines (i.e., electrically-powered drive motors, or electric drives) may be used to transport fluids. For example, at least some known fluid transport systems use fluid transport apparatus such as compressors, fans and/or pumps that are driven by gas turbines. Often turbines drive the associated fluid transport apparatus via a gearbox that controls a gas turbine output drive shaft speed to a predetermined apparatus drive shaft speed.

When mechanical drives and/or electrical machinery are used to transport fluids within pipelines of fluid transport systems, it is necessary to determine the flow rate of the fluid within the pipelines. More specifically, maintaining the stability of the flow rate of fluid channeled through the pipelines is desired.

Several known devices may be used to measure the flow rate of fluids in fluid transport systems. For example, at least some known flow meters and/or sensors may be welded within a pipeline to measure the flow of fluid within the pipeline. In some of such systems, transducers or sensors are inserted into the openings formed within the pipeline. However, such devices may be problematic as the welding may deform the pipeline and/or the pipeline may be damaged when the openings are formed. Moreover, the alignment of the transducers or sensors inserted into the openings may shift during operation. Because of the possibility of alignment shifts, the accuracy of the measurements provided by such transducers or sensors may be limited.

BRIEF DESCRIPTION OF THE INVENTION

In one embodiment, a sensor assembly for use with a fluid transport system is provided. The sensor assembly includes at least two sensors that are configured to measure a rate of flow of a fluid channeled through a pipeline of the fluid transport system. Moreover, the sensor assembly includes an annular collar that is coupled to the two sensors. The collar includes at least a first opening and at least a second opening defined therein. The first opening and the second opening are each sized to receive the two sensors therein such that the two sensors are substantially coaxially aligned with each other. A first sensor of the two sensors is positioned downstream from a second sensor of the two sensors.

In another embodiment, a fluid transport system is provided. The fluid transport system includes at least one pipeline and a sensor assembly that substantially circumscribes the pipeline. The sensor assembly includes at least two sensors that are configured to measure a rate of flow of a fluid channeled through the pipeline. Moreover, the sensor assembly includes an annular collar that is coupled to the two sensors. The collar includes at least a first opening and at least a second opening defined therein. The first opening and the second opening are each sized to receive the two sensors therein such that the two sensors are substantially coaxially aligned with each other. A first sensor of the two sensors is positioned downstream from a second sensor of the two sensors In yet another embodiment, a method of assembling a sensor assembly for use with a fluid transport system is provided. The method includes coupling at least two sensors configured to measure a rate of flow of a fluid within a pipeline of the fluid transport system to an annular collar. The annular collar includes at least a first opening and at least a second opening defined therein. Moreover, the first opening and the second opening are configured to receive the sensors therein such that the two sensors are substantially coaxially aligned with each other. A first sensor of the two sensors is positioned downstream from a second sensor of the two sensors.

DETAILED DESCRIPTION OF THE INVENTION

The exemplary apparatus, systems, and methods described herein overcome at least some disadvantages of known techniques and sensor systems used to measure the flow rate of fluids within fluid transport systems by providing a sensor assembly that includes sensors that are securely coupled to a pipeline of a fluid transport system such that substantially accurate measurements of the flow rate of a fluid channeled within the pipeline are facilitated. In the exemplary embodiment, the sensor assembly includes an annular collar that is coupled to at least two sensors. The collar includes at least two openings that are sized to receive a sensor therein. The collar substantially circumscribes the pipeline and is configured to secure the sensors to the pipeline such that the sensors are substantially coaxially aligned with each other. Such an orientation enables the sensors to provide substantially accurate measurements of the flow rate of the fluid within the pipeline.

Figure 1:
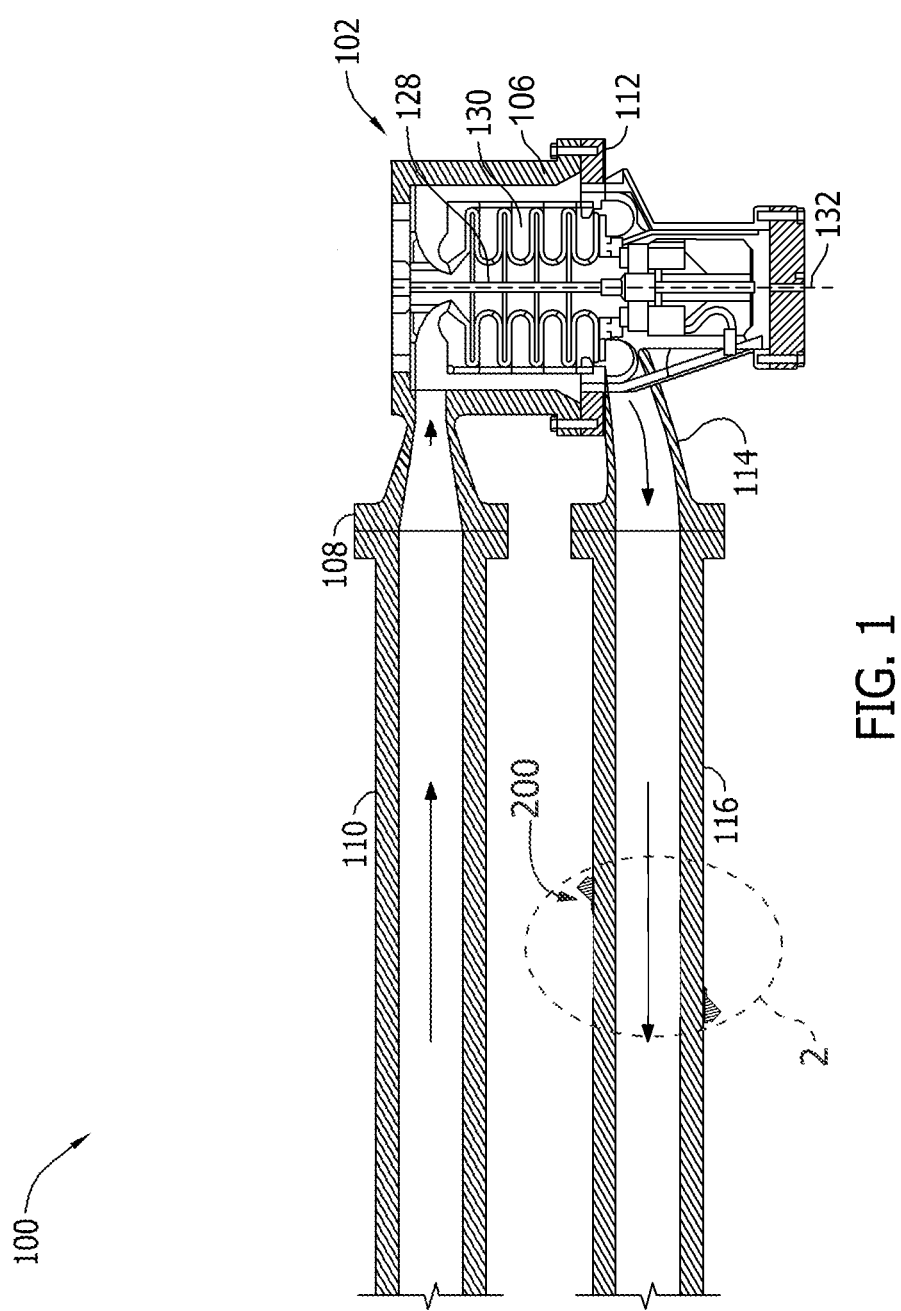
FIG. 1 is a cross-sectional schematic view of a portion of an exemplary fluid transport system.

FIG. 1 is a cross-sectional schematic view of a portion of an exemplary fluid transport system 100. In the exemplary embodiment, system 100 is a submerged natural gas compressing station that includes a fluid transport assembly 102. While the exemplary embodiment includes a natural gas compressing station, the present invention is not limited to any one particular system, and one of ordinary skill in the art will appreciate that the current invention may be used in connection with other fluid transport systems.

In the exemplary embodiment, system 100 includes a housing 106 and that assembly 102 is secured within housing 106. In the exemplary embodiment, housing 106 includes an assembly suction fixture 108 that is coupled in flow communication to an inlet pipeline 110. In the exemplary embodiment, system 100 also includes an assembly end piece 112 that is coupled to housing 106 such that piece 112 extends outward from housing 106. End piece 112 encloses assembly 102 within system 100 subsequent to insertion of assembly 102 into housing 106 and includes an assembly discharge fixture 114 that is coupled in flow communication to an outlet pipeline 116 that is substantially similar to inlet pipeline 110.

In the exemplary embodiment, assembly 102 includes a rotatable drive shaft 128 that is rotatably coupled to a rotor (not shown). Moreover, assembly 102 includes at least one assembly stage 130. The rotor and shaft 128 are rotatable about an axis of rotation 132. In the exemplary embodiment, a sensor assembly 200 is coupled to outlet pipeline 116. Although in the exemplary embodiment sensor assembly 200 is illustrated as being coupled to pipeline 116, it should be noted that sensor assembly 200 is not limited to being coupled to any particular pipeline within system 100, and one of ordinary skill in the art will appreciate that sensor assembly 200 may be used with any pipeline within system 100. Sensor assembly 200, in the exemplary embodiment, includes at least two sensors (not shown in FIG. 1) that are used to measure a rate of flow of transport fluid channeled through pipeline 116. Sensor assembly 200, in the exemplary embodiment, is manufactured such that sensor assembly 200 may be sized and shaped to be coupled to any substantially large pipeline, such as a pipeline that has a diameter of at least approximately 24 inches.

During operation, in the exemplary embodiment, system 100 receives natural gas via inlet pipeline 110 at a first predetermined pressure. The gas is channeled to assembly 102 via suction fixture 108 and is compressed to a greater density and smaller volume at a second predetermined pressure that is higher than the first predetermined pressure. The compressed gas is discharged to outlet pipeline 116 via discharge fixture 114. The rate of flow of the fluid is measured via the sensors that are included in sensor assembly 200.

Figure 2:
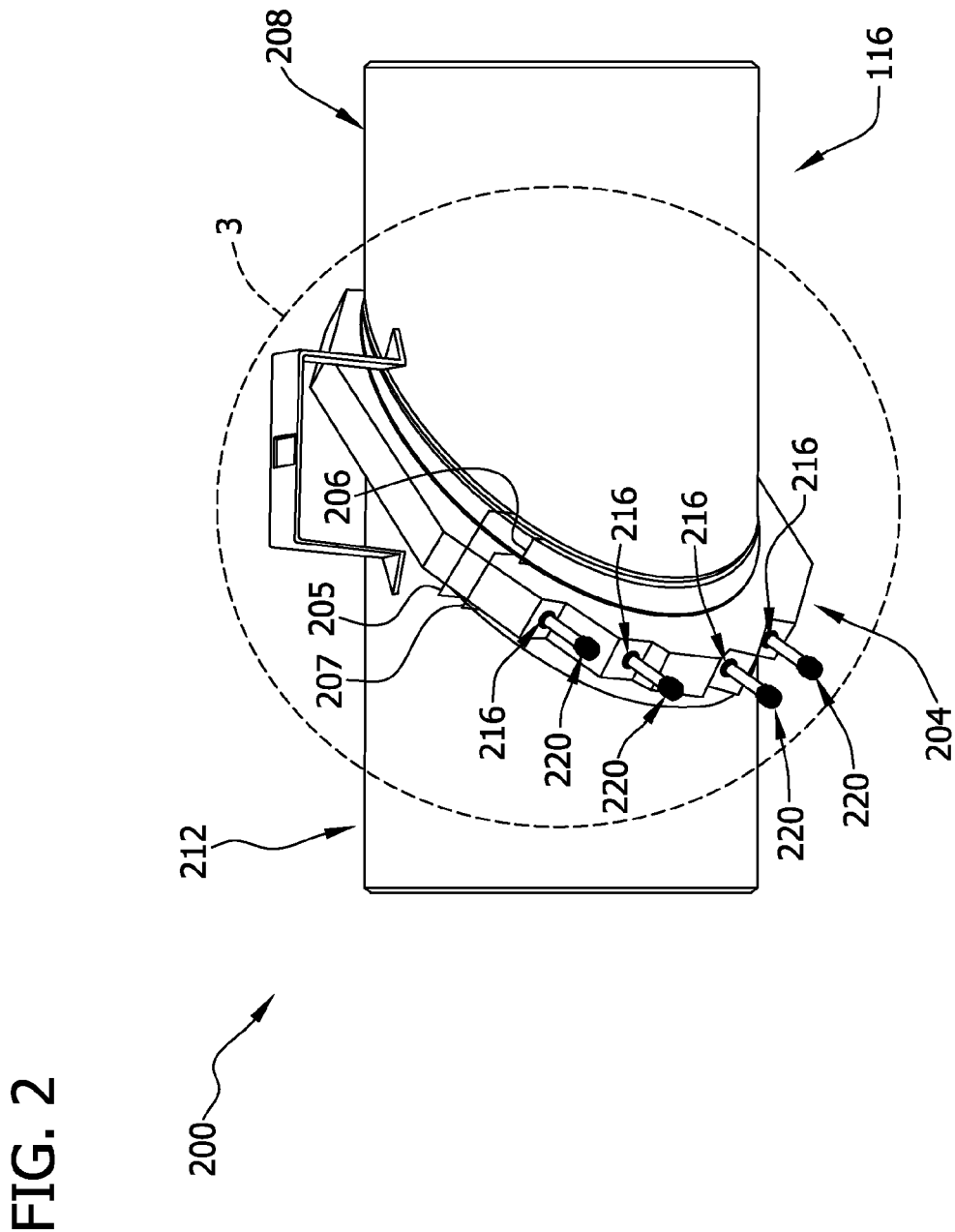
FIG. 2 is a schematic view of an exemplary sensor assembly that may be used with the fluid transport system shown in FIG. 1 and taken along area 2.

FIG. 2 is a side schematic view of sensor assembly 200 coupled to a portion of outlet pipeline 116 and taken along area 2 (shown in FIG. 1). In the exemplary embodiment, sensor assembly 200 includes an annular collar 204 that is substantially elliptical. Annular collar 204 may be formed from any material, such as, but not limited to, a metallic material and/or a metal alloy material, that enables predetermined operational parameters associated with the fluid being transported to be satisfied and that enables assembly 200 to function as described herein.

In the exemplary embodiment, collar 204 includes an interior surface (not shown in FIG. 2) and an exterior surface 205. Exterior surface 205 has a first portion 206 that substantially circumscribes the interior surface of annular collar 204. Exterior surface 205 also has a second portion 207 that extends outwardly from first portion 206. In the exemplary embodiment, first portion 206 is formed integrally with second portion 207. Alternatively, first portion 206 may be coupled to second portion 207.

Collar 204, in the exemplary embodiment, is coupled to outlet pipeline 116 such that collar 204 substantially circumscribes at least a portion of outlet pipeline 116. More specifically, a cut (not shown) is formed through outlet pipeline 116 between a first portion 208 and a second portion 212. In the exemplary embodiment, the cut is formed using a cutting tool, such as a saw. Alternatively, the cut may be formed using any known method that enables sensor assembly 200 to function as described herein. In the exemplary embodiment, annular collar 204 is coupled to pipeline 116 such that pipe first portion 208 and pipe second portion 212 are securely coupled via collar 204. Alternatively, collar 204 may be coupled to pipeline 116 in any manner that enables sensor assembly 200 to function as described herein.

Collar 204 includes at least a first opening 216 that extends through collar 204. More specifically, in the exemplary embodiment, collar 204 includes four first openings 216. Alternatively, collar 204 includes any number of openings that enables sensor assembly 200 to function as described herein. Moreover, collar 204 also includes at least a second opening (not shown in FIG. 2) that is described in more detail below. In the exemplary embodiment, collar 204 is coupled to outlet pipeline 116 such that each first opening 216 and each second opening are positioned at a 45 degree angle with respect to the fluid flow within pipeline 116.

In the exemplary embodiment, sensor assembly 200 includes at least two sensors 220 that are used to measure a rate of flow of transport fluid channeled through pipeline 116. In the exemplary embodiment, sensors 220 are compact ultrasonic transducers that transmit and receive ultrasonic pluses through the fluid being channeled through pipeline 116. Alternatively, sensors 220 may be any type of sensor that enables fluid flow rates to be measured and that fit within sensor assembly 200 to enable assembly 200 to function as described herein.

In the exemplary embodiment, each sensor 220 is coupled to collar 204. More specifically, each sensor 220 is at least partially inserted within a respective opening 216. As such, in the exemplary embodiment, each of four sensors 220 shown in FIG. 2 are each at least partially inserted within a respective first opening 216. Moreover, in the exemplary embodiment, sensors 220 are also coupled to a flow meter (not shown) that is used to calculate the velocity and volumetric flow rate of the fluid. Alternatively, sensors 220 may be coupled to any other device that can measure fluid flow rates within pipeline 116 and that enables sensor assembly 200 to function as described herein. The flow meter may be a component within assembly 200 or a separate structure that is coupled to assembly 200.

Figure 3:
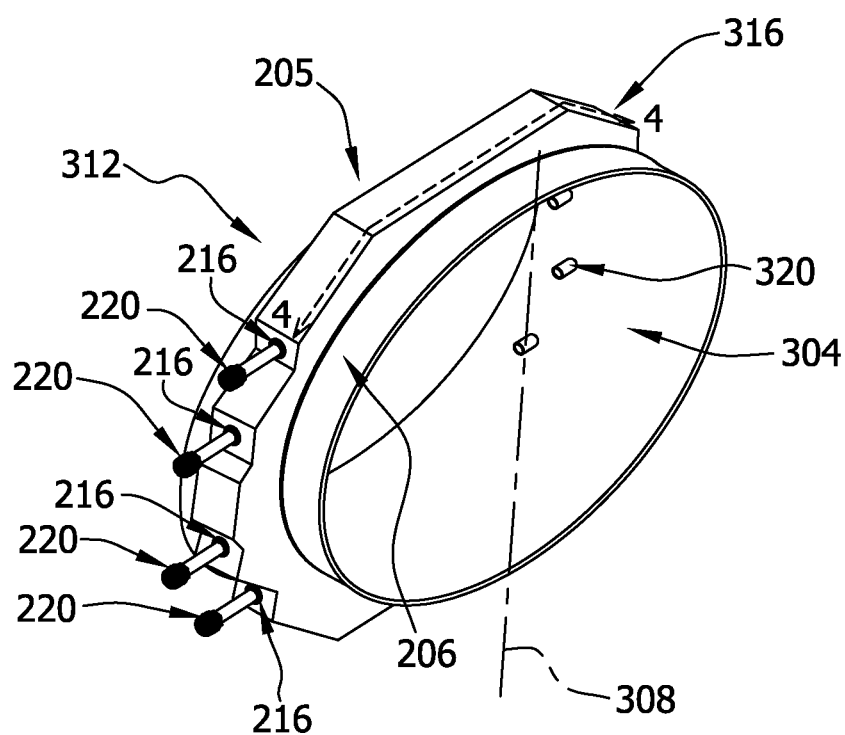
FIG. 3 is a perspective schematic view of the sensor assembly shown in FIG. 2 and taken along area 3.

FIG. 3 is a perspective schematic view of sensor assembly 200 taken along area 3 (shown in FIG. 2). Collar 204 includes exterior surface 205 and an interior surface 304 that is opposite surface 205. Portion 206 of exterior surface 205 substantially circumscribes interior surface 304. Moreover, collar 204 is formed symmetrically about a centerline or axis of symmetry 308 that extends therethrough such that a first portion 312 and a second portion 316 each extend outwardly from centerline 308. In the exemplary embodiment, collar first portion 312 is aligned substantially symmetrically with respect to collar second portion 316 and with respect to centerline 308.

In the exemplary embodiment, first openings 216 are defined in collar first portion 312. More specifically, each first opening 216 extends from exterior surface 205 to interior surface 304 of collar first portion 312. Collar 204 also includes at least a second opening 320 defined therein. More specifically, in the exemplary embodiment, collar 204 includes four second openings 320 that extend through collar second portion 316 from exterior surface 205 to interior surface 304. In the exemplary embodiment, the number of first openings 216 defined within collar first portion 312 is equal to the number of second openings 320 defined within collar second portion 316. More specifically, in the exemplary embodiment, collar first portion 312 includes four first openings 216 and collar second portion 316 includes four second openings 320. Alternatively, collar first and second portion 312 and 316, respectively, may have any number of openings 216 that enable assembly 200 to function as described herein. Collar 204 may be manufactured with openings 216 and 320 and collar 204 may be subsequently welded onto pipeline 116 (shown in FIG. 1).

In the exemplary embodiment, sensors 220 are at least partially inserted within first openings 216 and second openings 320. More specifically, each sensor 220 is inserted within a respective first opening 216 and a respective second opening 320 such that each sensor extends from collar exterior surface 205 to collar interior surface 304. In the exemplary embodiment, four sensors 220 are inserted at least partially within four different first openings 216 of first portion 312, and four sensors 220 are each inserted at least partially within four different second openings 320 of collar second portion 316.

Figure 4:
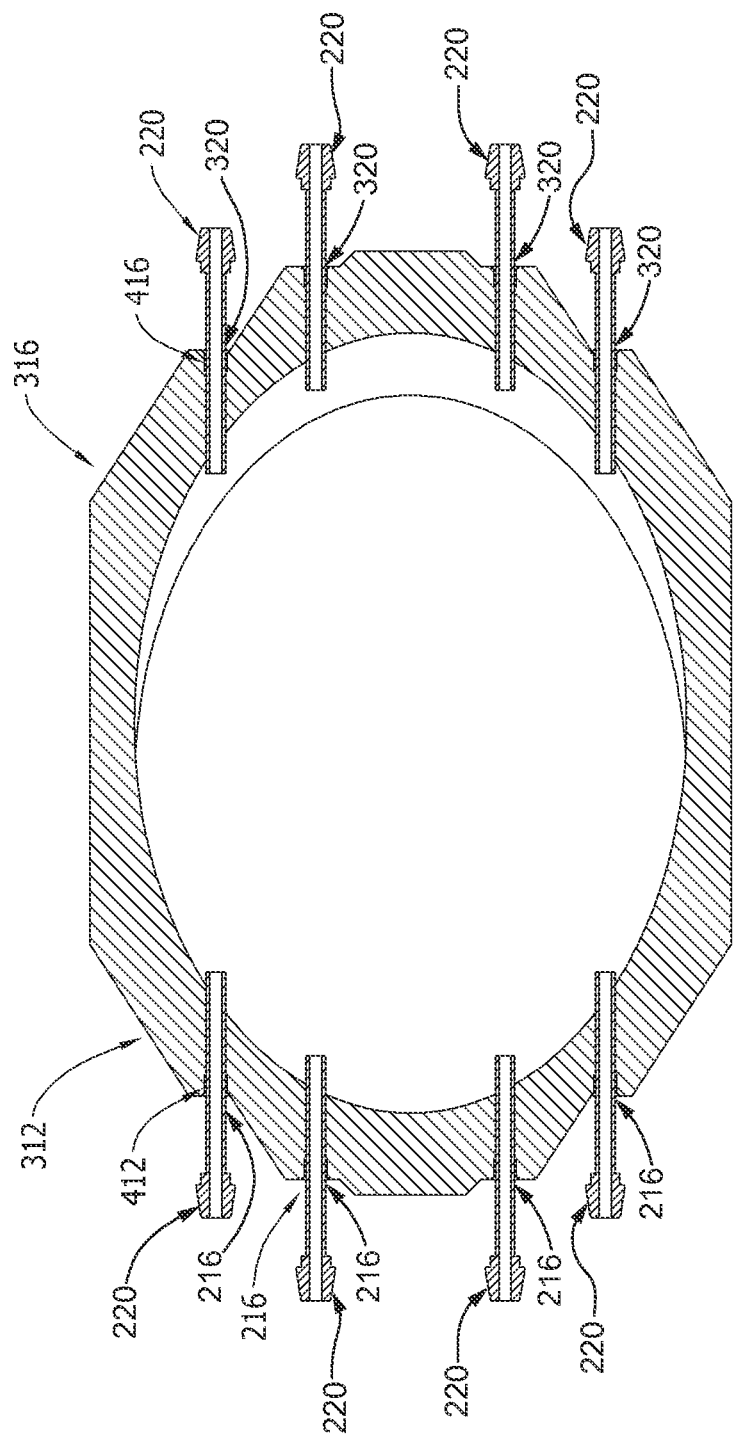
FIG. 4 is a cross-sectional schematic view of the sensor assembly shown in FIG. 3 and taken along line 4-4.

FIG. 4 is a cross-sectional schematic view of sensor assembly 200 and taken along line 4-4 (shown in FIG. 3). In the exemplary embodiment, openings 216 are aligned substantially parallel to each other within collar first portion 312. Similarly, second openings 320 are aligned substantially parallel with respect to each other within collar second portion 316.

Moreover, in the exemplary embodiment, first openings 216 are aligned substantially coaxially with respect to second openings 320. More specifically, each respective first opening 216 is aligned substantially coaxially with respect to each respective second opening 320. Such an alignment and orientation enables any sensor 220 that is inserted at least partially within first opening 216 to be aligned substantially coaxially with respect to another sensor 220 that is inserted at least partially within second opening 320.

For example, in the exemplary embodiment, sensors 220 includes a first sensor 412 that is at least partially inserted within first opening 216 and a second sensor 416 that is at least partially inserted within second opening 320. The alignment and orientation of first opening 216 with respect to second opening 320 enables first sensor 412 to be aligned substantially coaxially with respect to second sensor 416. The alignment and orientation of first opening 216 with respect to second opening 320 enables second sensor 416 to be downstream of first sensor 412 when assembly 200 is coupled to pipeline 116 (shown in FIG. 1). Alternatively, first sensor 412 may be downstream of second sensor 416 when assembly 200 is coupled to pipeline 116.

During operation, fluid transport system 100 (shown in FIG. 1) receives natural gas via inlet pipeline 110 (shown in FIG. 1) at a first predetermined pressure. The gas channeled to assembly 102 (shown in FIG. 1) via suction fixture 108 (shown in FIG. 1) is compressed to a greater density and smaller volume at a second predetermined pressure that is higher than the first predetermined pressure. The compressed gas is then discharged to outlet pipeline 116 via discharge fixture 114.

In the exemplary embodiment, as gas is channeled through outlet pipeline 116, first sensor 412 detects a rate of flow of the gas and transmits a signal to second sensor 416. Second sensor 416 receives the signal and then transmits a reflective signal to first sensor 412. Because first sensor 412 is aligned substantially coaxially with respect to second sensor 416, the signals that are transmitted between first sensor 412 and second sensor 416 are transmitted at a relatively rapid rate. The rapid transmission rate enables sensors 412 and 416 to provide substantially accurate signals to one another. Moreover, each of the signals that are transmitted from first sensor 412 to second sensor 416 are then transmitted to the flow meter (not shown). The flow meter then calculates the velocity and volumetric flow rate of the gas within pipeline 116.

As compared to known systems, apparatus, and methods that are used to measure the flow rate of fluids in fluid transport systems, the above-described sensor assembly may be used with fluid transport systems to enable more accurate measurements of the rate of flow. More specifically, in the exemplary embodiment, the sensor assembly includes an annular collar that is coupled to at least two sensors. The collar includes at least two openings that are sized to receive a sensor therein. The collar substantially circumscribes the pipeline and is configured to secure the sensors to the pipeline such that the sensors are substantially coaxially aligned with each other. Such an orientation enables the sensors to provide substantially accurate measurements of the flow rate of the fluid within the pipeline.

Exemplary embodiments of systems, apparatus, and methods are described above in detail. The systems, apparatus, and methods are not limited to the specific embodiments described herein, but rather, components of the sensor assembly and/or steps of assembling the sensor assembly may be utilized independently and separately from other components and/or steps described herein. For example, the sensor assembly may also be used in combination with other systems and methods, and is not limited to practice with only a fluid transport system as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor assembly for use with a fluid transport system, said sensor assembly comprising:
   a plurality of sensors configured to measure a rate of flow of a fluid channeled through a pipeline of the fluid transport system; and
   an annular collar coupled to said plurality of sensors, said collar comprises a first plurality of openings and a second plurality of openings defined therein, each of said first plurality of openings and each of said second plurality of openings is sized to receive one of said plurality of sensors therein, such that at least two of said plurality of sensors received in said openings are substantially coaxially aligned with each other and such that a first of said plurality of sensors is positioned downstream from a second of said plurality of sensors.

2. A sensor assembly in accordance with claim 1, wherein each of said first plurality of openings is substantially coaxially aligned with respect to said second plurality of openings.

3. A sensor assembly in accordance with claim 1, wherein said collar comprises an exterior surface and an interior surface opposite said exterior surface.

4. A sensor assembly in accordance with claim 3, wherein each of said first plurality of openings and each of said second plurality of openings extends from said exterior surface to said interior surface.

5. A sensor assembly in accordance with claim 3, wherein said exterior surface comprises:
   a first portion substantially circumscribing said interior surface; and a second portion extending outwardly from said first portion.

6. A sensor assembly in accordance with claim 5, wherein said second portion is formed integrally with said first portion.

7. A fluid transport system comprising:
at least one pipeline; and
a sensor assembly substantially circumscribing said at least one pipeline, said sensor assembly comprising:
   a plurality of sensors configured to measure a rate of flow of a fluid channeled through said at least one pipeline; and
   an annular collar coupled to said plurality of sensors, said collar comprises a first plurality of openings and a second plurality of openings defined therein, each of said first plurality of openings and each of said second plurality of openings is sized to receive one of said plurality of sensors therein, such that at least two of said plurality of sensors received in said openings are substantially coaxially aligned with each other and such that a first of said plurality of sensors is positioned downstream from a second of said plurality of sensors.

8. A fluid transport system in accordance with claim 7, wherein each of said first plurality of openings is substantially coaxially aligned with respect to said second plurality of openings.

9. A fluid transport system in accordance with claim 7, wherein said collar comprises an exterior surface and an interior surface opposite said exterior surface.

10. A fluid transport system in accordance with claim 9, wherein each of said first plurality of openings and each of said second plurality of openings extend from said exterior surface to said interior surface.

11. A fluid transport system in accordance with claim 9, wherein said exterior surface comprises:
   a first portion substantially circumscribing said interior surface; and
   a second portion extending outwardly from said first portion.

12. A method of assembling a sensor assembly for use with a fluid transport system, said method comprising:
   coupling a plurality of sensors configured to measure a rate of flow of a fluid within a pipeline of the fluid transport system to an annular collar that includes a first plurality of openings and a second plurality of openings defined therein; and
   configuring each of the first plurality of openings and each of the second plurality of openings to receive one of the plurality of sensors therein, such that at least two of the plurality of sensors received in the openings are substantially coaxially aligned with each other, and such that a first of the plurality of sensors is downstream from a second of the plurality of sensors.

13. A method in accordance with claim 12, further comprising aligning each of the first plurality of openings to be substantially coaxial with respect to the second plurality of openings.

14. A method in accordance with claim 12, wherein coupling a plurality of sensors further comprises coupling the first sensor and the second sensor to the annular collar.

15. A method in accordance with claim 12, wherein coupling a plurality of sensors further comprises coupling the a plurality of sensors to an annular collar that includes an exterior surface and an interior surface.

16. A method in accordance with claim 15, further comprising configuring each of the first plurality of openings and each of the second plurality of openings to extend from the exterior surface to the interior surface.

17. A method in accordance with claim 16, wherein coupling the plurality of sensors to an annular collar that includes an exterior surface and an interior surface further comprises coupling the plurality of sensors to an annular collar that includes an exterior surface that includes a first portion substantially circumscribing the interior surface and a second portion extending outwardly from the first portion.

* * * * *